USO09475981B2

United States Patent
Abivin et al.

(10) Patent No.: US 9,475,981 B2
(45) Date of Patent: *Oct. 25, 2016

(54) FLUID VISCOSITY CONTROL (71) Applicant: SCHLUMBERGER TECHNOLOGY CORPORATION, Sugar Land, TX (US)

(72) Inventors: Patrice Abivin, Houston, TX (US); Wingki Lee, Houston, TX (US); Sergey Makarychev-Mikhailov, St. Petersburg (RU); Michael D. Parris, Richmond, TX (US); Andrey Mirakyan, Katy, TX (US); Rasika Prabhu, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/330,905

(22) Filed: Jul. 14, 2014

(65) Prior Publication Data
US 2015/0013984 A1 Jan. 15, 2015

Related U.S. Application Data (60) Provisional application No. 61/846,453, filed on Jul. 15, 2013.

(51) Int. Cl.
E21B 43/22 (2006.01)
E21B 43/26 (2006.01)
(Continued)

(52) U.S. Cl.
CPC .......... *C09K 8/887* (2013.01); *C09K 8/03* (2013.01); *C09K 8/685* (2013.01); *C09K 8/706* (2013.01); *C09K 8/90* (2013.01); *C09K 8/92* (2013.01); *E21B 43/16* (2013.01); *E21B 43/25* (2013.01)

(58) Field of Classification Search
CPC ........ C09K 8/685; C09K 8/887; C09K 8/90; C09K 8/68; C09K 8/512; E21B 43/26; E21B 21/068; E21B 43/25; E21B 43/16
See application file for complete search history.

(56) References Cited

U.S. PATENT DOCUMENTS 3,692,676 A 9/1972 Culter et al.
3,730,272 A 5/1973 Richardson et al.
(Continued)

FOREIGN PATENT DOCUMENTS

WO    WO 2006010912 A1 *  2/2006  ............. C09K 8/685

OTHER PUBLICATIONS

Bernhard, "Catalytic urea decomposition, side-reactions and urea evaporation in the selective catalytic reduction of NOx", A dissertation submitted to ETH Zurich for the degree of Doctor of Sciences, 2012, 193 pages.
(Continued)

*Primary Examiner* — Zakiya W Bates
(74) *Attorney, Agent, or Firm* — Jeffrey R. Anderson; Michael L. Flynn; Tim Curington (57) ABSTRACT

A method of treating a subterranean formation penetrated by a wellbore includes introducing a treatment fluid comprised at least a crosslinkable component, and a metal crosslinker to the subterranean formation, forming a crosslinked treatment fluid, and de-crosslinking bonds of the crosslinked treatment fluid by manipulating a pH of the treatment fluid with a pH triggering agent, wherein the pH triggering agent is an amine-precursor compound or a derivative thereof.

16 Claims, 5 Drawing Sheets

(51) Int. Cl.
*C09K 8/88* (2006.01)
*C09K 8/68* (2006.01)
*E21B 43/25* (2006.01)
*C09K 8/03* (2006.01)
*C09K 8/90* (2006.01)
*C09K 8/92* (2006.01)
*C09K 8/70* (2006.01)
*E21B 43/16* (2006.01)

(56) References Cited

U.S. PATENT DOCUMENTS

| | | |
|---|---|---|
| 4,168,299 A | 9/1979 | Schell et al. |
| 4,889,563 A | 12/1989 | Parker et al. |
| 4,961,466 A | 10/1990 | Himes et al. |
| 5,264,475 A | 11/1993 | Kissel |
| 5,972,850 A | 10/1999 | Nimerick |
| 6,239,183 B1 | 5/2001 | Farmer et al. |
| 6,482,866 B1 | 11/2002 | Dahayanake et al. |
| 6,498,988 B1 | 12/2002 | Robert et al. |
| 6,506,710 B1 | 1/2003 | Hoey et al. |
| 6,703,352 B2 | 3/2004 | Dahayanake et al. |
| 7,303,018 B2 | 12/2007 | Cawiezel et al. |
| 2003/0114539 A1 | 6/2003 | Weaver et al. |
| 2005/0056424 A1 | 3/2005 | Hanes, Jr. et al. |
| 2005/0215438 A1 | 9/2005 | Prud'Homme et al. |
| 2011/0240297 A1* | 10/2011 | Lord .............. C09K 8/512 166/308.5 |
| 2013/0228334 A1* | 9/2013 | Jiang .............. C09K 8/685 166/300 |

OTHER PUBLICATIONS

Borling, et al., "Pushing Out the Oil with Conformance Control", Oilfield Review, Apr. 1994, 15 pages.

Gulbis, et al., "Chapter 7: Fracturing Fluid Chemistry and Proppants", Reservoir Stimulation, Economides, M.J. and Nolte, K.G., John Wiley and Sons, Ltd, 3rd Edition, New York, 2000, pp. 7-1, 7-11, 7-23.

Kaminskaia, et al., "Kinetics and Mechanism of Urea Hydrolysis Catalyzed by Palladium(II) Complexes", Inorganic Chemistry, vol. 36, No. 25, Dec. 3, 1997, pp. 5917-5926.

Kirk, et al., "Nuts", Encyclopedia of Chemical Technology, Third Edition, Wiley-Interscience, vol. 16, 1981, pp. 248-273.

Maley, et al., "Breaker Enhancer for Crosslinked Borates: Novel Self-Generating Acid", SPE-137490-MS, Canadian Unconventional Resources and International Petroleum Conference, Calgary, Alberta, Canada, Oct. 19-21, 2010, 7 pages.

Sax, "Hawley's Condensed Chemical Dictionary", 11th Edition, Published by John Wiley & Sons, Inc 1987, 1987, p. 888.

International Search Report and Written Opinion Issued in PCT/US2014/046497 on Nov. 17, 2014, 11 pages.

\* cited by examiner

FLUID VISCOSITY CONTROL

CROSS-REFERENCE TO RELATED APPLICATION

This application claims the benefit of U.S. Provisional Application Ser. No. 61/846,453 filed Jul. 15, 2013 entitled "Fluid Viscosity Control" to Abivin et al., the disclosure of the provisional application is incorporated by reference herein in its entirety.

BACKGROUND

Hydrocarbons (oil, natural gas, etc.) are obtained from a subterranean geologic formation (a "reservoir") by drilling a well that penetrates the hydrocarbon-bearing formation. In the process of recovering hydrocarbons from subterranean formations, it is common practice to treat a hydrocarbon-bearing formation with a pressurized fluid to provide flow channels, i.e., to fracture the formation, or to use such fluids to control sand to facilitate flow of the hydrocarbons to the wellbore.

Well treatment fluids, particularly those used in fracturing, may comprise water- or oil-based fluid incorporating a thickening agent, normally a polymeric material. Typical polymeric thickening agents for use in such fluids comprise galactomannan gums, such as guar and substituted guars such as hydroxypropyl guar (HPG) and carboxymethylhydroxypropyl guar (CMHPG). Cellulosic polymers such as hydroxyethyl cellulose (HEC) and carboxymethyl cellulose (CMC) may also be used, as well as synthetic polymers such as polyacrylamide. Sometimes the polymeric agent is modified with ionic groups to facilitate hydration of the polymer and to improve crosslinking with metal complexes. Ionic modification of the polymers can reduce the time it takes to dissolve the dry polymer at the well site, and improve both the ultimate gel strength and the thermal persistence of the gel upon crosslinking with a metal crosslinking complex.

In order to prevent the resulting fracture from closing upon release of fluid pressure, a hard particulate material known as a proppant, may be dispersed in the well treatment fluid to be carried into the resulting fracture and deposited therein. The well treatment fluid should possess a fairly high viscosity, such as, a gel-like consistency, at least when it is within the fracture so that the proppant can be carried as far as possible into the resulting fracture. Moreover, it would be desirable that the well treatment fluid exhibit a relatively low viscosity as it is being pumped down the wellbore, and in addition exhibit a relatively high viscosity when it is within the fracture itself. During this process, the proppant is transported by the carrier fluid from the wellbore to the tip of the fracture and does not settle, in which case the treatment and the integrity of the well is jeopardized.

To increase the viscosity, and, therefore, the proppant carrying ability of the fluid, as well as increase its high temperature stability, crosslinking of the polymeric materials may be employed. The viscosity of well treatment fluids (and by extension the transport properties of the proppant) may be enhanced by crosslinking with boron and/or a metal such as chromium aluminum, hafnium, antimony, or a Group 4 metal such as zirconium or titanium. In reference to Periodic Table "Groups," the new IUPAC numbering scheme for the Periodic Table Groups is used herein as found in Hawley's Condensed Chemical Dictionary, p. 888 (11th ed. 1987). Crosslinking a polymer solution may increase the steady shear viscosity up to two orders of magnitude. For well stimulation treatments, particularly hydraulic fracturing, this creates fracture width and transports proppant. When the treatment is complete, the fluid may degrade, so it can easily flow back to the surface and does not affect the subsequent production of hydrocarbons. Generally, chemicals like oxidizers or enzymes which degrade the polymer backbone are used to drastically reduce the viscosity of the fluid after a few hours under reservoir conditions.

Reversible crosslinking has been adequately described for boron-based crosslinkers, which is considered a non-metal based crosslinker. See U.S. Pat. No. 4,961,466, the disclosure of which is incorporated herein by reference herein in its entirety. However, it appears to be an accepted maxim that that reversibility based upon pH is untrue for metal-based crosslinkers, such as aluminum (Al), titanium (Ti) or zirconium (Zr). As described in the following citation: "To our knowledge, nothing was found on using pH as a triggering agent for metal-based crosslinked gels. It is considered that metal-based crosslinked bonds are irreversible: Unlike borate crosslinker, once the bond between transition metal crosslinker and polymer is broken, it does not reform." See Gulbis, J.; Hodge, R. M., Fracturing Fluid Chemistry and Proppants. In *Reservoir Stimulation Third Edition*, Economides, M. J.; Nolte, K. G., Eds. John Wiley and Sons, Inc.: 2000; pp 7-11, the disclosure of which is incorporated by reference herein in its entirety.

SUMMARY

Disclosures relate to compositions and methods for treating subterranean formations, in particular, oilfield stimulation compositions and methods using a crosslinkable component with a metal crosslinker, such as zirconium, titanium or aluminum, and adding a specific concentration of a pH-triggering agent to either enhance or decrease the viscosity of the treatment fluid, which de-crosslinks the blonds of the crosslinked treatment fluid.

DETAILED DESCRIPTION

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

The statements made herein merely provide information related to the present disclosure and may not constitute prior art, and may describe some embodiments illustrating aspects of the presently claimed subject matter.

Treatment fluids may be used in a variety of subterranean treatments, including, but not limited to, stimulation treatments and sand control treatments. As used herein, the term "treatment," or "treating," refers to any subterranean operation that uses a fluid in conjunction with a desired function and/or for a desired purpose. The term "treatment," or "treating," does not imply any particular action by the fluid or any particular component thereof.

The present application relates to methods and compositions for treating subterranean formations. More particularly, the present application relates to method of treating subterranean formation treatment fluids by introducing a treatment fluid that contains at least a crosslinkable component, a pH triggering agent and a metal crosslinker to the subterranean formation; forming a crosslinked treatment fluid, and de-crosslinking bonds of the crosslinked treatment fluid by manipulating a pH of the treatment fluid with the pH triggering agent.

The manipulation or change in pH can be achieved by addition of triggering agent, such as, for example, acid or bases. Specific examples of acids include α-, β- or γ-hydroxy carboxylic acids, acetic acid, sulfuric acid, lactic acid, glycolic acid, or hydrochloric acid. Specific examples of bases include potassium hydroxide, sodium hydroxide, calcium hydroxide, alkali metal or alkaline earth metal bicarbonates, alkali metal or alkaline earth metal carbonates or ammonia. The raise or decrease in pH can be controlled so it is delayed (slow kinetics) in order for the viscosity to be enhanced or decreased in the subterranean formation at different times after mixing the components.

Crosslinkable Component

The treatment fluids or compositions suitable for use in the methods of the present disclosure comprise a crosslinkable component. As discussed above, a "crosslinkable component," as the term is used herein, is a compound and/or substance that comprises a crosslinkable moiety. For example, the crosslinkable components may contain one or more crosslinkable moieties, such as a carboxylate and/or a cis-hydroxyl (vicinal hydroxyl) moiety, which is able to coordinate with the reactive sites of the crosslinker. The reactive sites of the crosslinker may be, for example, the site where the metals (such as Al, Zr and Ti or other transition metals or any combination thereof) are present.

The crosslinkable component may be natural or synthetic polymers (or derivatives thereof) that comprise a crosslinkable moiety, for example, substituted galactomannans, guar gums, high-molecular weight polysaccharides composed of mannose and galactose sugars, or guar derivatives, such as hydrophobically modified guars, guar-containing compounds, and synthetic polymers. Suitable crosslinkable components may comprise a guar gum, a locust bean gum, a tara gum, a honey locust gum, a tamarind gum, a karaya gum, an arabic gum, a ghatti gum, a tragacanth gum, a carrageenen, a succinoglycan, a xanthan, a diutan, alginates, a hydroxylethylguar hydroxypropyl guar, a carboxymethylhydroxyethyl guar, a carboxymethylhydroxypropylguar, a carboxyalkyl cellulose, such as carboxymethyl cellulose (CMC) or carboxyethyl cellulose, an alkylcarboxyalkyl cellulose, an alkyl cellulose, an alkylhydroxyalkyl cellulose, a carboxyalkyl cellulose ether, a hydroxyethylcellulose, a carboxymethylhydroxyethyl cellulose, a carboxymethyl starch, a copolymer of 2-acrylamido-2methyl-propane sulfonic acid and acrylamide, a terpolymer of 2-acrylamido-2methyl-propane sulfonic acid, acrylic acid, acrylamide, or derivative thereof. The crosslinkable component may also be a synthetic polymer such as, for example, a partially hydrolyzed polyacrylamide (PHPA), polyacrylic acid or polymethacrylic acid.

In embodiments, the crosslinkable components may present at about 0.01% to about 4.0% by weight based on the total weight of the treatment fluid, such as at about 0.10% to about 2.0% by weight based on the total weight of the treatment fluid.

The term "derivative" herein refers, for example, to compounds that are derived from another compound and maintain the same general structure as the compound from which they are derived.

The treatment fluid of the present disclosure may be a solution initially having a very low viscosity that can be readily pumped or otherwise handled. For example, the viscosity of the fluid may be from about 1 cP to about 10,000 cP, or be from about 1 cP to about 1,000 cP, or be from about 1 cP to about 100 cP at the treating temperature, which may range from a surface temperature to a bottom-hole static (reservoir) temperature, such as from about 4° C. to about 250° C., or from about 10° C. to about 200° C., or from about 25° C. to about 150° C., or from about 32° C. to about 100° C.

Crosslinking the fluid of the present disclosure generally increases its viscosity. As such, having the composition in the uncrosslinked/unviscosified state allows for pumping of a relatively less viscous fluid having relatively low friction pressures within the well tubing, and the crosslinking may be delayed in a controllable manner such that the properties of thickened crosslinked fluid are available at the rock face instead of within the wellbore. Such a transition to a crosslinked/uncrosslinked state may be achieved over a period of minutes or hours based on the particular molecular make-up of the crosslinker, and results in the initial viscosity of the treatment fluid increasing by at least an order of magnitude, such as at least two orders of magnitude.

Suitable solvents for use with the fluid in the present disclosure may be aqueous or organic based. Aqueous solvents may include at least one of fresh water, sea water, brine, mixtures of water and water-soluble organic compounds and mixtures thereof. Organic solvents may include any organic solvent with is able to dissolve or suspend the various components of the treatment fluid, such as, for example, organic alcohols, such as, isopropanol.

In some embodiments, the treatment fluid may initially have a viscosity similar to that of the aqueous solvent, such as water. An initial water-like viscosity may allow the solution to effectively penetrate voids, small pores and crevices, such as encountered in fine sands, coarse silts, and other formations. In other embodiments, the viscosity may be varied to obtain a desired degree of flow sufficient for decreasing the flow of water through or increasing the load-bearing capacity of a formation. The rate at which the viscosity of the treatment fluid changes may be varied by the choice of the crosslinker, polymer and pH triggering agent employed in the treatment fluid. The viscosity of the treatment fluid may also be varied by increasing or decreasing the amount of solvent relative to other components, or by other techniques, such as by employing viscosifying agents. In embodiments, the solvent, such as an aqueous solvent, may represent up to about 99.9 weight percent of the treatment fluid, such as in the range of from about 85 to about 99.9 weight percent of the treatment fluid, or from about 98 to about 99.7 weight percent of the treatment fluid.

Metal Crosslinking Agent

The metal crosslinking agent in the treatment fluids of the present application may comprise a polyvalent metal ion that is capable of crosslinking at least two molecules of the crosslinkable component. Examples of suitable metal ions include, but are not limited to, zirconium IV, titanium or aluminum and/or other transition metals, or combined. However, the metal crosslinking agent (and thus the treatment fluid) does not include a non-metal crosslinking agent such as boron. The metal ions may be provided by providing any compound, such as a salt or complex of any of the metals described above, which is capable of producing one or more of these metal ions. Examples of such compounds include zirconyl chloride, zirconium sulfate and triethanol titanate.

In some embodiments, the metal crosslinking agent is present in the treatment fluid in an amount from about 0.1 to about 1.0% by volume. In some embodiments, the metal crosslinking agent comprises about 0.3% by volume of the fluid. Considerations one may take into account in deciding how much crosslinking agent may be needed include the temperature conditions of a particular application, the composition of the gelling agent used, and/or the pH of the treatment fluid. Other considerations may be evident to one skilled in the art.

The metal crosslinking agent may also comprise a stabilizing agent operable to provide sufficient stability to allow the crosslinking agent to be uniformly mixed into the polymer solution. Examples of suitable stabilizing agents include, but are not limited, to propionate, acetate, formate, triethanolamine, and triisopropanolamine. Additional stabilizing agents are discussed below.

The treatment fluid should not begin to build viscosity before it is placed into the desired portion of a subterranean formation. If it builds viscosity too quickly, this would interfere with pumping and placement of the crosslinkable polymer composition into the formation.

In embodiments, the chemicals bonds of the crosslinked fluid may be "de-crosslinked" when exposed to a pH triggering agent. As used herein, the terms "de-crosslink", "de-crosslinking" and "de-crosslinked" each refer to the disruption or removal a sufficient number of the crosslinked bonds formed between the metal crosslinking agent and the crosslinkable component such that the viscosity of the decrosslinked polymer is about the same as the viscosity of the linear polymer. The viscosity can thus drop from a value ranging between about 300 to about 3000 cP, such as, for example, from about 500 cP to about 1500 cP and from about 750 cP to about 1000 cP, when the gel is decrosslinked to a value ranging from about 1 cP to about 120 cP, such as, for example, from about 50 cP to about 100 cP and from about 50 cP to about 75 cP, corresponding to the linear gel. If needed, the viscosity of the decrosslinked gel can be further reduced by the use of additional chemical breakers such as enzymes, alkali metal persulfate or ammonium persulfate to obtain a water-like consistency.

Furthermore, the terms "de-crosslink," "de-crosslinking" and "de-crosslinked" should not be confused with "breakings" or "breakers." While breakers may be also added in various treatments fluids, these materials permanently break the backbone of the polymer. However, in other embodiments, the treatment fluid does not include a breaker material. On the contrary, the de-crosslinking process preserves the polymer so the crosslinkable component can be subsequently crosslinked under favorable conditions of crosslinker concentration and pH.

The ability of the fluid to penetrate the subterranean formation depends on the permeability of the subterranean formation and the viscosity of the fluid. In embodiments, the viscosity of the fluid is sufficiently low as to not slow penetration of the consolidating fluid into the subterranean formation. In a low-permeability subterranean formation, the viscosity of the fluid is sufficiently low as to not slow penetration of the consolidating fluid into the subterranean formation. For example, in a low-permeability subterranean formation, suitable initial viscosities may be similar to that of water, such as from about from about 1 cP to about 10,000 cP, or be from about 1 cP to about 1,000 cP, or be from about 1 cP to about 100 cP at the treating temperature, which may range from a surface temperature to a bottom-hole static (reservoir) temperature, such as from about 4° C. to about 80° C., or from about 10° C. to about 70° C., or from about 25° C. to about 60° C., or from about 32° C. to about 55° C.

In embodiments, the de-crosslinking is triggered with a pH triggering agent. The pH triggering agent may any material that once exposed to treatment fluid to manipulate the pH of the treatment fluid, such that the pH may increase or decrease depending.

The pH triggering agent may be a suspended solid that can dissolve in a controlled manner in the treatment fluid and the dissolution of which modifies the pH of the solution. Examples of such solids include magnesium oxide, alkali or alkaline earth carbonates or bicarbonates which can be dispersed in the fluid and the dissolution rate controlled by temperature, pressure and/or the size of particles. The control over the dissolution of the particles may give control over the change in the pH of the fluid.

The pH triggering agent, such as for example, pH buffers such as, sodium hydroxide, sodium carbonate, sodium bicar- bonate, hydrochloric acid, acetic acid, in which the pH-modifying agent is encapsulated in a way so it is released in a controlled manner at specific reservoir conditions.

The pH triggering agent may also be present in the subterranean formation. For example, as the treatment fluid comes into contact with the subterranean formation, various amounts of inorganic materials may be dissolved into the treatment fluid and thus can modify the pH of the fluid. For instance, carbonate reservoirs are known for releasing sodium carbonate or sodium bicarbonate in the fluid. Sodium carbonate and bicarbonate are natural buffering agents which will modify the pH of the fluid. Various pH buffers can be added in the fluid to counteract the influence of rock-fluid interactions and to control the rate of change in pH of a fluid in contact with the formation.

Acids such as acetic acid, lactic acid, glycolic acid and hydrochloric acid can be used in concentrations ranging from about 0.01 to about 1 vol %, such as, for example, from about 0.05 to about 0.5 vol % and from about 0.1 to about 0.25 vol % (depending on the acidic solution) to reduce the pH of the fluid (either alkaline or acidic) and induce cross-linking. De-crosslinking can be achieved by adding an alkaline agent to increase the pH of the fluid (either alkaline or acidic). Specific examples of alkaline agents include solutions of sodium hydroxide or potassium hydroxide in concentrations from 0.01 to 1 vol %, such as, for example, from about 0.05 to about 0.5 vol % and from about 0.1 to about 0.25 vol % depending on the alkaline solution. However, this amount may be varied if a delaying process is designed with the base.

The pH triggering agent may also be an amine-precursor compound as well as its associated derivatives that modifies the pH at downhole conditions to de-crosslink the treatment fluid. Examples of amine-precursor compounds include urea, urea derivatives, peptides, polypeptides (as the hydrolysis rate of a peptide bond releases an amine), cyclic peptides, amino acids, and carbamates.

As discussed above, urea and urea derivatives are examples of pH triggering agents. Urea, also called carbamide, has the chemical structure of Formula 1 identified below:

Urea is a highly soluble in water organic chemical (having a solubility of 108 g/100 mL at 20° C.), and may be characterized as having a low toxicity.

In aqueous solutions, urea can hydrolyze to produce ammonia and carbon dioxide, which can raise the pH of the solution, and the simplified reaction can be written as:

The urea hydrolysis rate depends on multiple parameters, such as, for example, temperature, solution pH and the presence of catalysts. Without a catalyst, the hydrolysis of urea may take a long period of time (e.g., hours to days at temperatures 150-300° F.). Such a delay is may be desirable or undesirable depending on the oilfield application.

In presence of catalysts, the hydrolysis rate of urea can increase significantly, leading to complete urea degradation at ambient conditions in seconds, as in presence of the enzyme urease. Urease is a nickel-containing metalloenzyme of high molecular weight. While urease is often quite effective, the stability of urease is limited, as at elevated temperatures it denatures and the pure enzyme is only effective in relatively narrow pH range (e.g., 7.4). One possibility to overcome this denaturing effect is to use so-called "crude urease", as ground Jack beans, collected from the genus of plants called *Canavalia*. The Jack beans powder retains its catalytic activity even at 200° F. and after prolonged storage at ambient conditions. Suitable examples of urea catalysts include vanadium pentoxide, titanium (IV) oxide, zirconium (IV) oxide, aluminum oxide, zeolites, palladium complexes and silicon dioxide. Additional examples of catalysts are described in U.S. Pat. No. 4,168,299, the disclosure of which is incorporated by reference herein in its entirety.

In embodiments, the pH triggering agent may be a urea derivative. Urea derivatives are compounds that upon hydrolysis, form an amine, such as ammonia. Examples of urea derivatives include N,N-dimethylurea, N-N-diethylurea, N,N-diallylurea, N,N-dipropylurea, N,N dibutylurea, 1,1,3,3-tetramethylurea, 1,1,3,3-tetraethylurea, 1,1,3,3-tetraethylurea, hexamethylenetetramine (hexamine), 2-imidazolidone, 2-Aminoethyl urea, imidazolidinyl urea, N,N-bis (hydroxymethyl)urea, N-(3-methoxypropyl)urea, 2-imidazolidone. Additional details regarding urea derivatives are described in U.S. Pat. No. 4,889,563, the disclosure of which is incorporate by reference herein in its entirety.

Furthermore, the urea derivative may have a general formula of:

wherein A is a chalcogen (elements of the group VI-B of the Periodic table, which include oxygen, sulfur, selenium, tellurium and polonium), R1 and R2 are independently chosen from hydrogen, NR3R4, NR5 or monovalent organic radicals, with at least one of R1 and R2 being NR3R4 or NR5, R3 and R4 are independently chosen from hydrogen and monovalent organic radical and R5 is a divalent organic radical. Either or both R3 and R4, and one of R1 and R2, can be any monovalent organic radical having from about 1 to about 10 atoms other hydrogen, such as, for example, from about 1 to about 5 atoms other than hydrogen. Specific examples of R1, R2, R3 and R4 include alkyl, aryl, alkenyl, alkenaryl, aralkyl, aralkenyl, cycloalkyl, cycloalkenyl, or alkynyl, which can be unsubstituted or substituted with pendant functional groups such as hydroxyl, carboxyl, oxide, thio, thiol, or others, and may contain acyclic or cyclic heteroatoms such as oxygen, sulfur, nitrogen, phosphorus, or others. R5 is divalent organic radical such as alkdyl, ardyl, alkenydyl, alkyndyl, aralkdyl, aralkendyl, which may contain pendant atoms or substituents and/or cyclic or acyclic heteroatoms as described for R3 and R4.

Urea derivatives with nitrogen atoms bridged of the general formula wherein R6 can be an alkyl chain with 1 to about 5 atoms, which may further incorporate heteroatoms, and R3 and R4 as defined above. Specific examples of urea derivatives include 2-imidazolidone; N,N'-trimethyleneurea; polycyclic urea derivatives, such as uretidine-2,4-dione, cyanuric acid, glycoluril and the like. Additional examples include urea, thiourea, formamide, polymers of urea and thiourea, such as biuret, triuret, mono-, di-, tri- and tetraalkyl substituted ureas, thiourea, polymeric ureas and thioureas, formamides and thioformamides, with the alkyl groups having 10 carbon atoms or less, such as, for example, 5 carbon atoms or less, and combinations of these. Hexamethylenetetramine can be also used as a delay pH trigger, as shown in U.S. Pat. No. 4,889,563, cited above. The chemical is often referred as hexamine and has the formula:

Hexamine is used in various water control (conformance) gels. In aqueous solutions hexamine is hydrolyzed at temperature producing ammonia and formaldehyde. Released ammonia will raise pH and can be used to trigger precipitation of inorganic gels; formaldehyde can be used in organic water control gels, e.g. based on polyacrylamide, as allows covalent crosslinking of the polymer. In the present invention hexamine can be used as a delayed pH trigger to de-crosslink metal-crosslinked polymer gels.

Other amine-precursors can be amino acids, peptides, polypeptides and cyclic peptides, such as lysine, asparagine, glutamine, aspartic acid, arginine, asparagine, cysteine, histidine, serine, threonine, tyrosine, carnosine, kyotorphin, aspartame, barettin, pseudoproline, glycylglycine, glutathione, angiotensin, bradykinen, oxytocin, somatostatin, endothelin, melitin, glucagon, mycobacillin, octreotate.

Amine-precursors can also be carbamates. Examples of carbamates are methy carbamate, ethyl carbamate, carbafuran, carbaryl, furathiocarb, fenoxycarb, aldicarb, oxamyl, methiocarb, metolcarb, iodopropynyl butylcarbamate, thiocarbamate and polyurethane.

Additional pH triggering agents may be used to "re-crosslink" the treatment fluid. As defined herein, the terms "re-crosslink," "re-crosslinking" and "re-crosslinked," each refer to the reestablishment of a substantial portion, such as, for example, at least 80% of the original crosslinked bonds between the metal-based crosslinker and the crosslinkable component. For example, a base may be added to increase the pH and thus de-crosslink crosslinked bonds formed between the crosslinkable component and the metal crosslinking agent, while an acid may be added to increase the pH and re-crosslink the crosslinked bonds. The additional pH triggering agent, if included in the treatment fluid, may be present in the treatment fluid in an amount of 0.01% to about 1%, based upon the total weight of the treatment fluid.

Additional Materials

While the treatment fluids of the present disclosure are described herein as comprising the above-mentioned components, it should be understood that the fluids of the present disclosure may optionally comprise other chemically different materials. In embodiments, the fluid may further comprise stabilizing agents, surfactants, diverting agents, or other additives. Additionally, the treatment fluid may comprise a mixture various other crosslinking agents, and/or other additives, such as fibers or fillers, provided that the other components chosen for the mixture are compatible with the intended use of forming a crosslinked three dimensional structure that at least partially seals a portion of a subterranean formation, such as a water bearing portion of a subterranean formation, permeated by the treatment fluid or treatment fluid. In embodiments, the treatment fluid of the present disclosure may further comprise one or more components such as, for example, a gel breaker, a buffer, a proppant, a clay stabilizer, a gel stabilizer and a bactericide. Furthermore, the treatment fluid or treatment fluid may include buffers, pH control agents, and various other additives added to promote the stability or the functionality of the fluid. The treatment fluid or treatment fluid may be based on an aqueous or non-aqueous solution. The components of the treatment fluid or treatment fluid may be selected such that they may or may not react with the subterranean formation that is to be sealed.

In this regard, the treatment fluid may include components independently selected from any solids, liquids, gases, and combinations thereof, such as slurries, gas-saturated or non-gas-saturated liquids, mixtures of two or more miscible or immiscible liquids, and the like, as long as such additional components allow for the formation of a three dimensional structure upon substantial completion of the crosslinking reaction. For example, the fluid or treatment fluid may comprise organic chemicals, inorganic chemicals, and any combinations thereof. Organic chemicals may be monomeric, oligomeric, polymeric, crosslinked, and combinations, while polymers may be thermoplastic, thermosetting, moisture setting, elastomeric, and the like. Inorganic chemicals may be metals, alkaline and alkaline earth chemicals, minerals, and the like. Fibrous materials may also be included in the fluid or treatment fluid. Suitable fibrous materials may be woven or nonwoven, and may be comprised of organic fibers, inorganic fibers, mixtures thereof and combinations thereof.

Surfactants can be added to promote dispersion or emulsification of components of the fluid, or to provide foaming of the crosslinked component upon its formation downhole. Suitable surfactants include alkyl polyethylene oxide sulfates, alkyl alkylolamine sulfates, modified ether alcohol sulfate sodium salts, or sodium lauryl sulfate, among others. Any surfactant which aids the dispersion and/or stabilization of a gas component in the fluid to form an energized fluid can be used. Viscoelastic surfactants, such as those described in U.S. Pat. No. 6,703,352, U.S. Pat. No. 6,239,183, U.S. Pat. No. 6,506,710, U.S. Pat. No. 7,303,018 and U.S. Pat. No. 6,482,866, each of which are incorporated by reference herein in their entirety, are also suitable for use in fluids in some embodiments. Examples of suitable surfactants also include, but are not limited to, amphoteric surfactants or zwitterionic surfactants. Alkyl betaines, alkyl amido betaines, alkyl imidazolines, alkyl amine oxides and alkyl quaternary ammonium carboxylates are some examples of zwitterionic surfactants. An example of a useful surfactant is the amphoteric alkyl amine contained in the surfactant solution AQUAT 944® (available from Baker Petrolite of Sugar Land, Tex.). A surfactant may be added to the fluid in an amount in the range of about 0.01 wt % to about 10 wt %, such as about 0.1 wt % to about 2 wt % based upon total weight of the treatment fluid.

Charge screening surfactants may be employed. In some embodiments, the anionic surfactants such as alkyl carboxylates, alkyl ether carboxylates, alkyl sulfates, alkyl ether sulfates, alkyl sulfonates, α-olefin sulfonates, alkyl ether sulfates, alkyl phosphates and alkyl ether phosphates may be used. Anionic surfactants have a negatively charged moiety and a hydrophobic or aliphatic tail, and can be used to charge screen cationic polymers. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Cationic surfactants have a positively charged moiety and a hydrophobic or aliphatic tail, and can be used to charge screen anionic polymers such as CMHPG.

The treatment fluids described herein may also include one or more inorganic salts. Examples of these salts include water-soluble potassium, sodium, and ammonium salts, such as potassium chloride, ammonium chloride or tetramethyl ammonium chloride (TMAC). Additionally, sodium chloride, calcium chloride, potassium chloride, sodium bromide, calcium bromide, potassium bromide, sodium sulfate, calcium sulfate, sodium phosphate, calcium phosphate, sodium nitrate, calcium nitrate, cesium chloride, cesium sulfate, cesium phosphate, cesium nitrate, cesium bromide, potassium sulfate, potassium phosphate, potassium nitrate salts may also be used. Any mixtures of the inorganic salts may be used as well. The inorganic salt may be added to the fluid in an amount of from about 0.01 wt % to about 80 wt %, from about 0.1 wt % to about 20 wt %, from about 0.1 wt % to about 10 wt %, based upon total weight of the treatment fluid.

In other embodiments, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in aqueous energized fluids.

Friction reducers may also be incorporated in any fluid embodiment. Any suitable friction reducer polymer, such as polyacrylamide and copolymers, partially hydrolyzed polyacrylamide, poly(2-acrylamido-2-methyl-1-propane sulfonic acid) (polyAMPS), and polyethylene oxide may be used. Commercial drag reducing chemicals such as those sold by Conoco Inc. under the trademark "CDR" as described in U.S. Pat. No. 3,692,676 or drag reducers such as those sold by Chemlink designated under the trademarks FLO1003, FLO1004, FLO1005 and FLO1008 have also been found to be effective. These polymeric species added as friction reducers or viscosity index improvers may also act as excellent fluid loss additives reducing or even eliminating the use of conventional fluid loss additives. Latex resins or polymer emulsions may be incorporated as fluid loss additives. Shear recovery agents may also be used in embodiments.

Embodiments may also include proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it may be from about 20 to about 100 U.S. Standard Mesh in size. With synthetic proppants, mesh sizes about 8 or greater may be used. Naturally occurring materials may be underived and/or unprocessed naturally occurring materials, as well as materials based on naturally occurring materials that have been processed and/or derived. Suitable examples of naturally occurring particulate materials for use as proppants include: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particulation, processing, etc. Further information on nuts and composition thereof may be found in ENCYCLOPEDIA OF CHEMICAL TECHNOLOGY, Edited by Raymond E. Kirk and Donald F. Othmer, Third Edition, John Wiley & Sons, vol. 16, pp. 248-273, (1981).

The concentration of proppant in the fluid can be any concentration known in the art. For example, the concentration of proppant in the fluid may be in the range of from about 0.03 to about 3 kilograms of proppant added per liter of liquid phase. Also, any of the proppant particles can further be coated with a resin to potentially improve the strength, clustering ability, and flow back properties of the proppant.

A fiber component may be included in the fluids to achieve a variety of properties including improving particle suspension, and particle transport capabilities, and gas phase stability. Fibers used may be hydrophilic or hydrophobic in nature. Fibers can be any fibrous material, such as, for example, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids, the fiber component may be included at concentrations from about 1 to about 15 grams per liter of the liquid phase of the fluid, such as a concentration of fibers from about 2 to about 12 grams per liter of liquid, or from about 2 to about 10 grams per liter of liquid.

Embodiments may further use fluids containing other additives and chemicals that are known to be commonly used in oilfield applications by those skilled in the art. These include materials such as surfactants in addition to those mentioned hereinabove, breaker aids in addition to those mentioned hereinabove, oxygen scavengers, alcohol stabilizers, scale inhibitors, corrosion inhibitors, fluid-loss additives, bactericides and biocides such as 2,2-dibromo-3-nitrilopropionamine or glutaraldehyde, and the like. Also, they may include a co-surfactant to optimize viscosity or to minimize the formation of stable emulsions that contain components of crude oil.

As used herein, the term "alcohol stabilizer" is used in reference to a certain group of organic molecules substantially or completely soluble in water containing at least one hydroxyl group, which are susceptible of providing thermal stability and long term shelf life stability to aqueous zirconium complexes. Examples of organic molecules referred as "alcohol stabilizers" include but are not limited to methanol, ethanol, n-propanol, isopropanol, n-butanol, tert-butanol, ethyleneglycol monomethyl ether and the like.

Methods of the present disclosure may be used to seal or reduce the flow of an unacceptable amount of water (or other undesired material) into or near the wellbore. The phrase unacceptable amount of water (or other undesired material) may be determined on a case-by-case basis. As used herein, the terms "seal," "sealed" and "sealing" mean at least the ability to substantially prevent fluids, such as fluids comprising an unacceptable amount of water, to flow through the area where the crosslinkable components of the fluid were crosslinked. The terms "seal," "sealed" and "sealing" may also mean the ability to substantially prevent fluids from flowing between the medium where the crosslinkable components of the fluid were crosslinked and whatever surface it is sealing against, for example an open hole, a sand face, a casing pipe, and the like.

In some embodiments, the crosslinking temperature may be set such that a crosslink, such as a crosslinked material formed from a crosslinker comprising Zr or Ti, is completed in the lower portion of the wellbore or after exiting the perforations into the fracture. This will minimize the damage done by high shear experienced during tubular transit. For example, the crosslinking temperature may be set at a temperature in the range of from 5° C. to about 50° C., such as a temperature in the range of from 10° C. to about 30° C. Metal-crosslinked polymer fluids can be shear-sensitive after they are crosslinked. In particular, exposure to high shear occurs within the tubulars during pumping from the surface to reservoir depth, and can cause an undesired loss of fluid viscosity and resulting problems such as screenout. As used herein, the term "high shear" refers to a shear rate of 500/second or more. The high-shear viscosity loss in metal-crosslinked polymer fluids that can occur during transit down the wellbore to the formation is generally irreversible and cannot be recovered.

The fluids of the present disclosure may be suitable for use in numerous subterranean formation types. For example, formations for which sealing with the fluids of the present disclosure may be used include sand, sandstone, shale, chalk, limestone, and any other hydrocarbon bearing formation.

The portion of the wellbore through which the fluid is injected into the treated zone can be open-hole (or comprise no casing) or can have previously received a casing. If cased, the casing is desirably perforated prior to injection of the fluid. Optionally, the wellbore can have previously received a screen. If it has received a screen, the wellbore can also have previously received a gravel pack, with the placing of the gravel pack optionally occurring above the formation fracture pressure (a frac-pack).

Techniques for injection of fluids with viscosities similar to those of the treatment fluids of the present disclosure are well known in the art and may be employed with the methods of the present disclosure. For example, known techniques may be used in the methods of the present disclosure to convey the fluids of the present disclosure into the subterranean formation to be treated.

In embodiments, the fluid may be driven into a wellbore by a pumping system that pumps one or more fluids into the wellbore. The pumping systems may include mixing or combining devices, wherein various components, such as fluids, solids, and/or gases maybe mixed or combined prior to being pumped into the wellbore. The mixing or combining device may be controlled in a number of ways, including, but not limited to, using data obtained either downhole from the wellbore, surface data, or some combination thereof. Methods of this disclosure may include using a surface data acquisition and/or analysis system, such as described in U.S. Pat. No. 6,498,988, incorporated herein by reference in its entirety. In embodiments, one or more fluid is pumped into the wellbore after detecting an unacceptable amount of water or other condition has been detected. Specific embodiments may comprise sealing the zone of interest (which may be where an unacceptable amount of water or other condition has been detected) using the fluid optionally with packers, such as straddle cup packers. Packers or similar devices can be used to control flow of the fluid into the subterranean formation for which sealing is desired.

In embodiments, the fluid may be injected into the subterranean formation at a pressure less than the fracturing pressure of the formation. For example, the fluids will be injected below the formation fracturing pressure of the respective formation.

The volume of fluids to be injected into subterranean formation is a function of the subterranean formation volume to be treated and the ability of the fluid of the present disclosure to penetrate the subterranean formation. The volume of fluid to be injected can be readily determined by one of ordinary skill in the art. As a guideline, the formation volume to be treated relates to the height of the desired treated zone and the desired depth of penetration. In embodiments, the depth of penetration of the fluid may be at least about 15 cm from the outer wall of the wellbore into the subterranean formation, such as the depth of penetration of at least about 30 cm from the outer wall of the wellbore.

In various embodiments, hydraulic fracturing involves pumping a proppant-free viscous fluid, or pad—such as water with some fluid additives to generate high viscosity—into a well faster than the fluid can escape into the formation so that the pressure rises and the rock breaks, creating artificial fractures and/or enlarging existing fractures. Then, proppant particles are added to the fluid to form slurry that is pumped into the fracture to prevent it from closing when the pumping pressure is released. In the fracturing treatment, fluids of are used in the pad treatment, the proppant stage, or both.

Specific embodiments of the present disclosure will now be described in detail with reference to the accompanying drawings. Further, in the following detailed description of embodiments of the present disclosure, numerous specific details are set forth in order to provide a more thorough understanding of the presently claimed subject matter. However, it will be apparent to one of ordinary skill in the art that the embodiments disclosed herein may be practiced without these specific details. In other instances, well-known features have not been described in detail to avoid unnecessarily complicating the description.

EXAMPLES

Example 1

Viscosity Change with pH

A 30 lbs/1000 galUS carboxymethyl cellulose gel was prepared in a laboratory blender and crosslinked by adding 3 galUS/1000 galUS of a zirconium/aluminum-based crosslinking agent. A few drops of diluted acetic acid were added to reduce the pH to 6.06. The crosslinking process then took place as the viscosity slowly rose with time. A sample was taken and its viscosity measured with a Contraves rheometer at $0.1\ s^{-1}$ at room temperature. After 30 minutes, the pH of the gel was raised to 8.5 by the addition of a few drops of 20% solution sodium hydroxide and mixed in a laboratory blender for a few seconds. The fluid was sampled a second time and the viscosity of the fluid at 0.1 s$^{-1}$ was measured for 20 minutes. The results of the viscosity measurements are shown below in FIG. 1.

Figure 1:
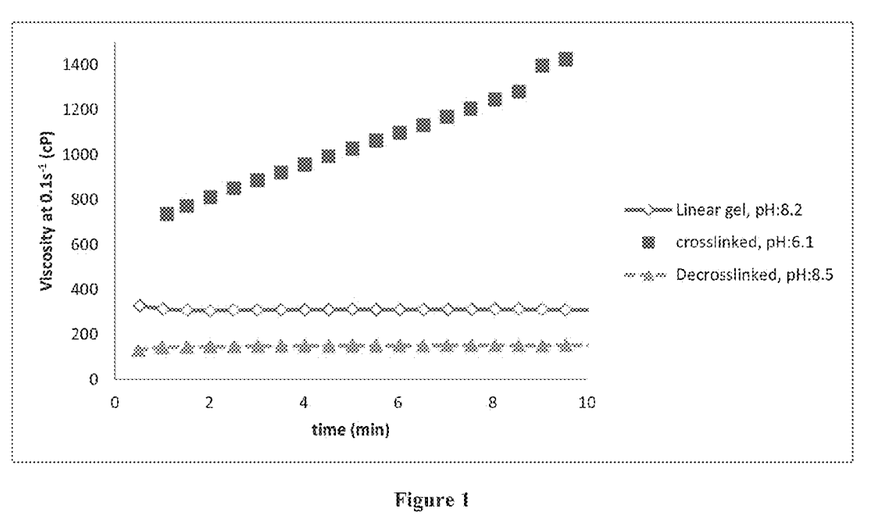
FIG. 1 is a graphical representation of a rheology profile, according to an embodiment of the disclosure.

As shown in FIG. 1, the viscosity of the gel drops drastically as the pH of the crosslinked gel is raised to 8.5. The de-crosslinked gel viscosity is constant and below the linear gel viscosity given as a reference.

Example 2

Figure 2:
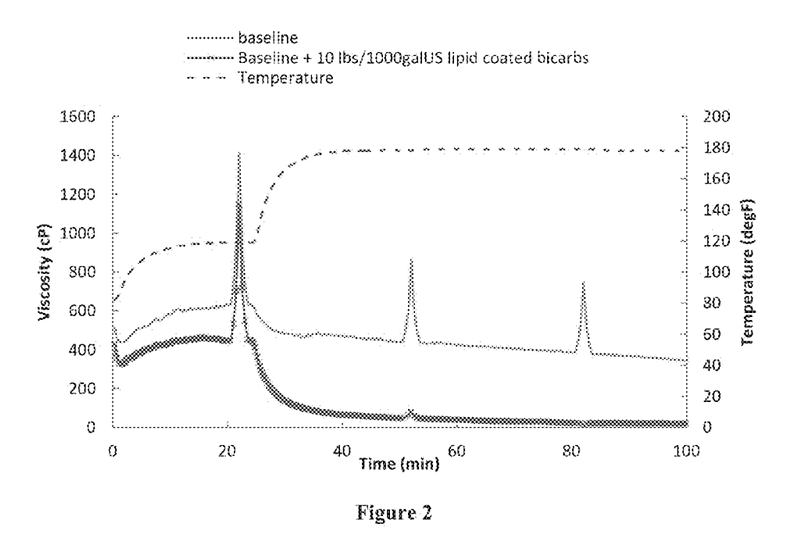
FIG. 2 is a graphical representation of a rheology profile, according to an embodiment of the disclosure.

A carboxymethyl cellulose gel was crosslinked at room temperature and a pH of 5.7. Encapsulated sodium bicarbonate (70% sodium bicarbonate) was then added to the solution (10 lb/1000 galUS). The sodium bicarbonate was designed to be released as the temperature of the fluid reaches approximately 140° F. As shown below in FIG. 2, the viscosity and the temperature of the fluid are given as a function of time. A comparison between the fluid and the fluid with bicarbonates is given.

As shown above in FIG. 2, the viscosity of the crosslinked gel was stable over 1000 cP as the temperature remained below 110° F. As the temperature was raised to 200° F., the sodium bicarbonate was released, which modified the pH of the gel. The viscosity of the gel then dropped because the fluid was decrosslinked due to the change in pH. The pH of the final fluid was 7.6. The control fluid's viscosity drops to about 400 cP due to the increase in temperature and a temperature-thinning effect. It remains crosslinked and maintain a stronger viscosity than the decrosslinked fluid.

Example 3

Figure 3:
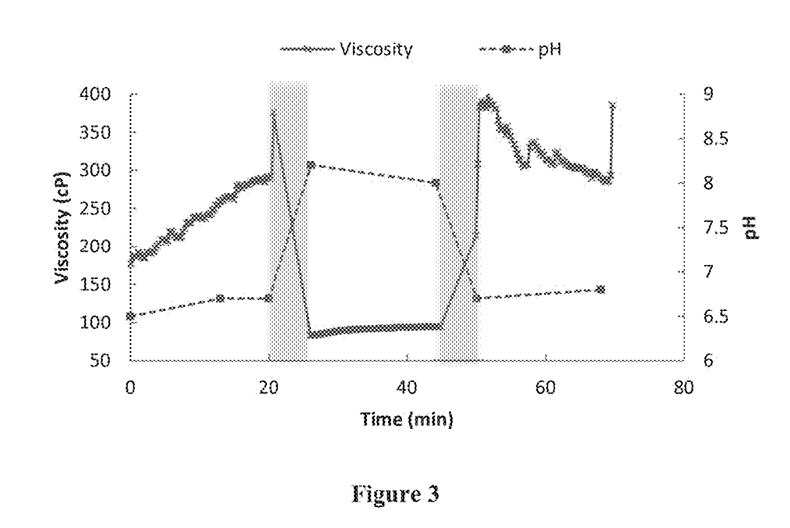
FIG. 3 is a graphical representation of a rheology profile, according to an embodiment of the disclosure.

FIG. 3 shows the de-crosslinking and re-crosslinking of a 30 lb/1000 galUS gel of carboxymethyl cellulose crosslinked with a zirconium/aluminum-based crosslinker. The pH of the fluid during the first 20 minutes was about 6.7, which was achieved by the addition of a few drops of an 80 wt % solution of acetic acid. The pH was then raised to about 7.7 by the addition of a few drops of 20% sodium hydroxide solution. The pH was reduced 6.8 by the addition of a few more drops of the above solution of acetic acid, which allowed the fluid to recover the viscosity of the crosslinked gel.

Example 4

A proppant pack retained permeability test was performed with a polyacrylamide fluid crosslinked with a zirconium-based crosslinker. The retained permeability at 300° F. is zero due to the high resilience of this polymer at high temperatures. A much higher retained permeability (48%) is obtained by the sole addition of encapsulated carbonates (100 lb/1000 galUS), which raise the pH and decrosslink the gel. This result is similar to the retained permeability obtained with the linear gel alone.

Example 5

Figure 4:
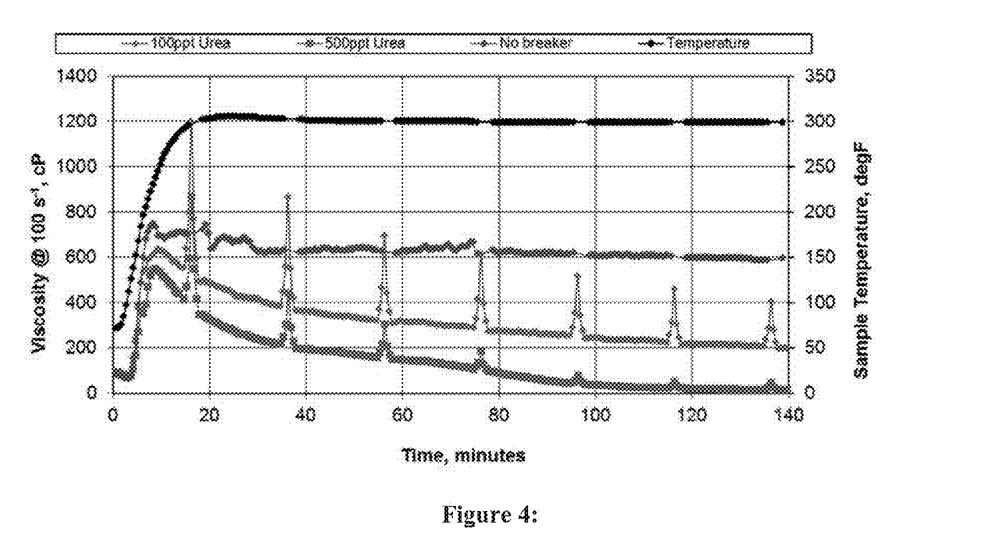
FIG. 4 is a graphical representation of a rheology profile, according to an embodiment of the disclosure.
Figure 5:
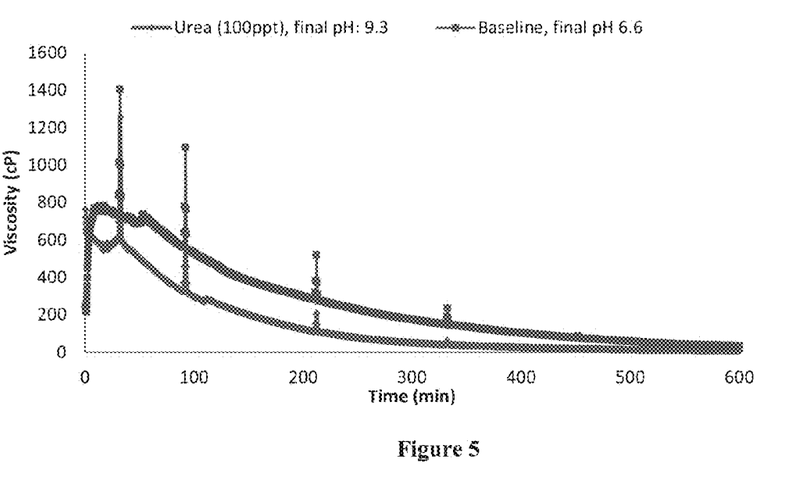
FIG. 5 is a graphical representation of a rheology profile, according to an embodiment of the disclosure.

3 mL/L zirconium crosslinker and 0.6 g/L sodium thiosulfate were added to a 4.8 g/L linear polymer gel based on polyacrylamide-polyacrylate co-polymer. The formulations tested were prepared by hydrating the polymer in tap water with an overhead mixer at 500-1000 rpm for at least 10 mins. Then, desired amounts of zirconium crosslinker, temperature stabilizer and urea were added to the hydrated polymer. To measure viscosity of the solutions, 50 mL samples were loaded into a rheometer cup in a Grace M5600 rheometer. The cup was attached a coquette-style rheometer with a R1-B5 configuration. The rheology tests were performed with American Petroleum Institute (API) ramping sequence, where a shear rate of 100/s with periodic shear-rate ramps of 100, 75, 50, 25, 50, 75, 100/s every 20 mins were applied. All tests were performed under at least 500 psi to avoid sample from boiling. The gel was stable at 300° F. for more than two hours. The same gels in presence of 12 g/L and 60 g/L urea demonstrate viscosity decrease with time, with slopes depending on urea concentration, as shown in FIG. 4.

Example 6

A 30 lb/1000 galUS carboxymethyl cellulose gel with and without 100 lb/1000 galUS urea was crosslinked with 3 mL/L zirconium crosslinker at room temperature and pH 6.3. To measure viscosity of the solutions, 50 mL samples were loaded into a rheometer cup in a Grace M5600 rheometer. The cup was attached a coquette-style rheometer with a R1-B5 configuration. The rheology tests were performed with American Petroleum Institute (API) ramping sequence, where a shear rate of 100/s with periodic shear-rate ramps of 100, 75, 50, 25, 50, 75, 100/s every 20 mins were applied. All tests were performed under at least 200 psi to avoid sample from boiling. The gel with urea shows faster viscosity reduction with time and the pH measured after 6 hours is 9.3. The pH of the urea-free gel after 6 hours is 6.6. This example shows that urea generates some amines which raise the pH and decrosslink the gel, leading to a faster viscosity reduction.

Example 7

Figure 6:
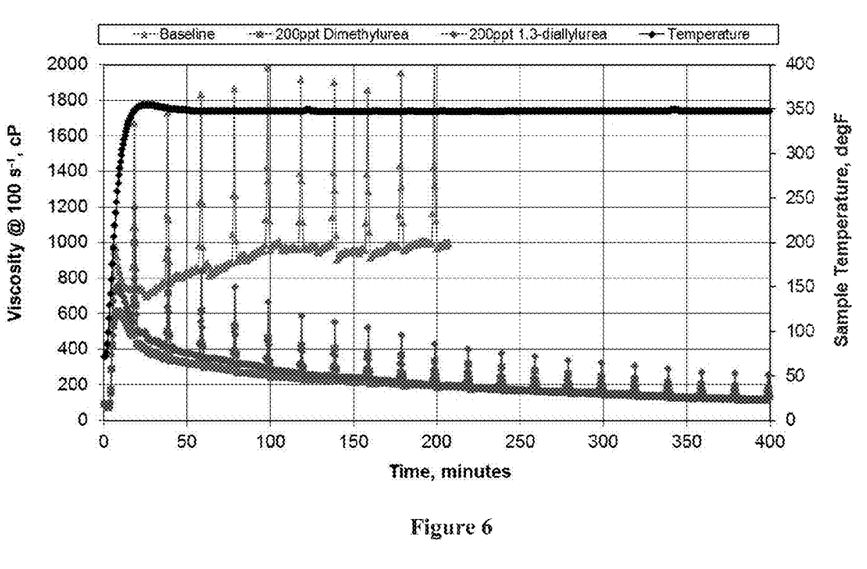
FIG. 6 is a graphical representation of a rheology profile, according to an embodiment of the disclosure.

3 mL/L zirconium crosslinker and 0.6 g/L sodium thiosulfate were added to 4.8 g/L linear polymer gel based on polyacrylamide-polyacrylate co-polymer. The formulations tested were prepared by hydrating the polymer in tap water with an overhead mixer at 500-1000 rpm for at least 10 mins. Then, desired amounts of zirconium crosslinker, temperature stabilizer, and urea derivatives were added to the hydrated polymer. To measure viscosity of the solutions, 50 mL samples were loaded into a rheometer cup in a Grace M5600 rheometer. The cup was attached a coquette-style rheometer with a R1-B5 configuration. The rheology tests were performed with American Petroleum Institute (API) ramping sequence, where a shear rate of 100/s with periodic shear-rate ramps of 100, 75, 50, 25, 50, 75, 100/s every 20 mins were applied. All tests were performed under at least 500 psi to avoid sample from boiling. The gel is stable at 350° F. for more than two hours. The same gels in presence of urea-derivatives (dimethylurea and diallylurea) demonstrate viscosity decrease with time, see FIG. 6.

Example 8

Figure 7:
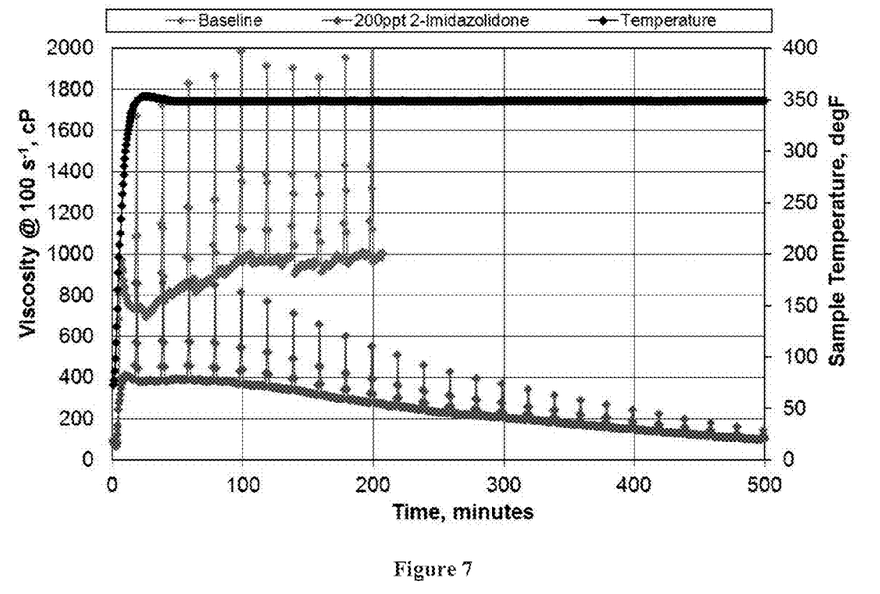
FIG. 7 is a graphical representation of a rheology profile, according to an embodiment of the disclosure.

3 mL/L zirconium crosslinker and 0.6 g/L sodium thiosulfate were added to a 4.8 g/L linear polymer gel based on polyacrylamide-polyacrylate co-polymer. The formulations tested were prepared by hydrating the polymer in tap water with an overhead mixer at 500-1000 rpm for at least 10 mins. Then, desired amounts of zirconium crosslinker, temperature stabilizer, and urea derivatives were added to the hydrated polymer. To measure viscosity of the solutions, 50 mL samples were loaded into a rheometer cup in a Grace M5600 rheometer. The cup was attached a coquette-style rheometer with a R1-B5 configuration. The rheology tests were performed with American Petroleum Institute (API) ramping sequence, where a shear rate of 100/s with periodic shear-rate ramps of 100, 75, 50, 25, 50, 75, 100/s every 20 mins were applied. All tests were performed under at least 500 psi to avoid sample from boiling. The gel is stable at 350° F. for more than two hours. The same gels in presence of urea-derivative (2-imidazolidone) demonstrate viscosity decrease with time. See FIG. 7.

Example 9

Figure 8:
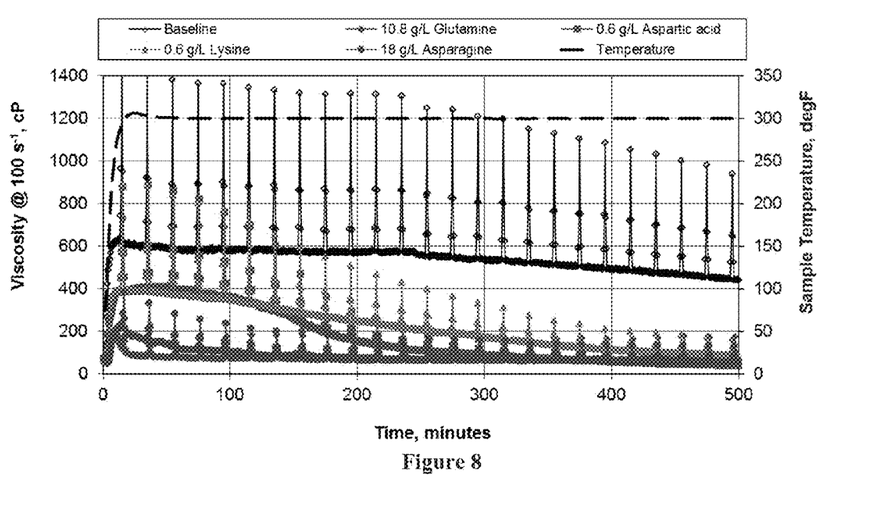
FIG. 8 is a graphical representation of a rheology profile, according to an embodiment of the disclosure.

3 mL/L zirconium crosslinker and 0.6 g/L sodium thiosulfate were added to 4.8 g/L linear polymer gel based on polyacrylamide-polyacrylate co-polymer. The formulations tested were prepared by hydrating the polymer in tap water with an overhead mixer at 500-1000 rpm for at least 10 mins. Then, desired amounts of zirconium crosslinker, temperature stabilizer, and amino acid were added to the hydrated polymer. To measure viscosity of the solutions, 50 mL samples were loaded into a rheometer cup in a Grace M5600 rheometer. The cup was attached a coquette-style rheometer with a R1-B5 configuration. The rheology tests were performed with American Petroleum Institute (API) ramping sequence, where a shear rate of 100/s with periodic shear-rate ramps of 100, 75, 50, 25, 50, 75, 100/s every 20 mins were applied. All tests were performed under at least 500 psi to avoid sample from boiling. The gel is stable at 350° F. for more than two hours. The same gels in presence of amino acids (0.6 g/L lysine, 10.8 g/L glutamine asparagine, or 0.6 g/L aspartic acid) demonstrate viscosity decrease with time. See FIG. 8.

Example 10

Figure 9:
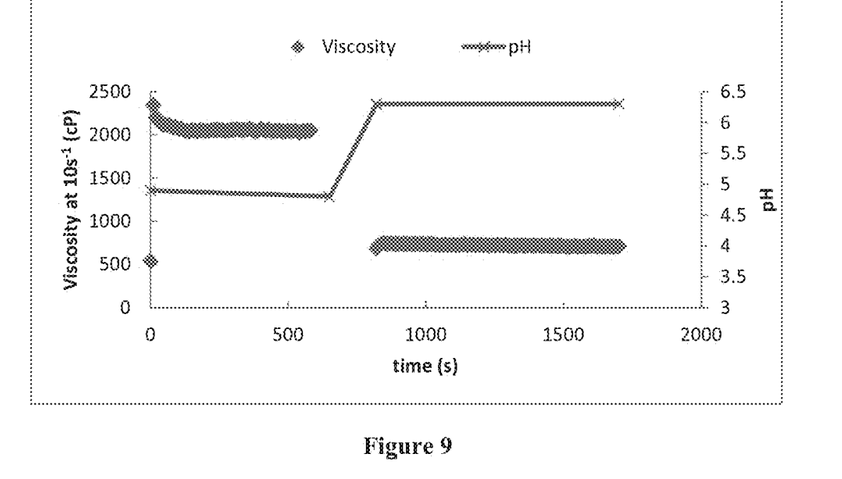
FIG. 9 is a graphical representation of a rheology profile, according to an embodiment of the disclosure.

200 cc of a 40 lb/1000 galUS xanthan gel was prepared in Waring blender and its viscosity was measured at 601 cP using an automated Grace M3600 at a constant shear rate of 10 $s^{-1}$ and room temperature. 1 galUS/1000 galUS of zirconium-based crosslinker and a few drops of diluted acetic acid were then added to the fluid, bringing the pH down to 4.7. The fluid crosslinked and was transferred to the M3600 for viscosity measurements. The viscosity of the crosslinked gel was recorded at 2000 cP (FIG. 9).

The fluid was then transferred to the blender, a few droplets of diluted sodium hydroxide were added (pH brought to 6.3) and the resulting fluid mixed for 30 seconds before being transferred to the rheometer cup for a new viscosity measurement. FIG. 9 shows that the viscosity dropped to 715 cP after raising the pH to 6.3. This viscosity is very close to the viscosity of the non-crosslinked gel in similar conditions (601 cP).

Example 11

Figure 10:
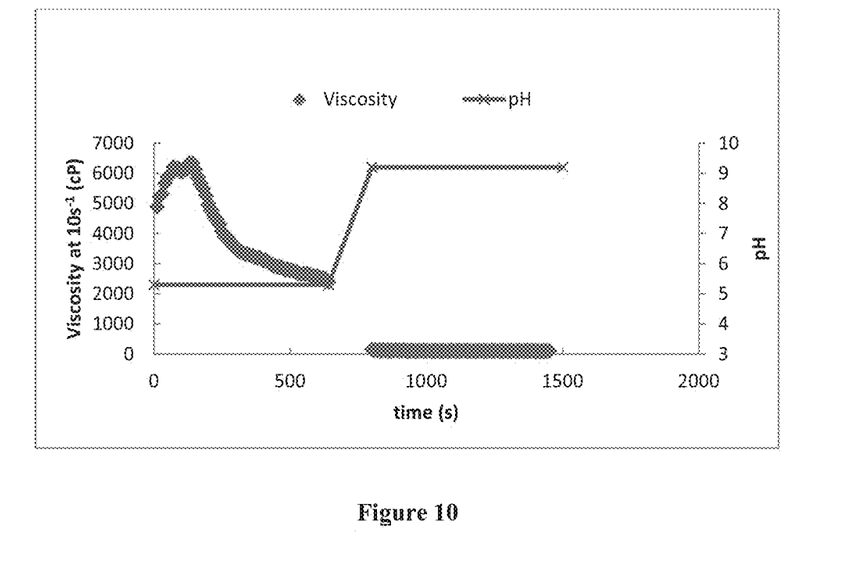
FIG. 10 is a graphical representation of a rheology profile, according to an embodiment of the disclosure.

200 cc of a 40 lb/1000 galUS alginate gel was prepared in Waring blender and its viscosity was measured at 82 cP using an automated Grace M3600 at a constant shear rate of 10 $s^{-1}$ and room temperature. 1 galUS/1000 galUS of zirconium-based crosslinker and a few drops of diluted acetic acid were then added to the fluid, bringing the pH down to 5.3. The fluid crosslinked and was transferred to the M3600 for viscosity measurements. The viscosity of the crosslinked gel was measured between 6160 and 2640 cP (FIG. 10). The fluid was then transferred to the blender, a few droplets of diluted sodium hydroxide were added (pH brought to 9.2) and the resulting fluid was mixed for 30 seconds before being transferred to the rheometer cup for a new viscosity measurement. FIG. 10 shows that the viscosity dropped to 100 cP after raising the pH to 9.2. This viscosity is similar to the viscosity of the non-crosslinked gel in similar conditions (82 cP).

Although the preceding descriptions has been described herein with reference to particular means, materials and embodiments, it is not intended to be limited to the particular disclosed herein; rather, it extends to all functionally equivalent structures, methods and uses, such as are within the scope of the appended claims. Further, those skilled in the art will readily appreciate that many modifications are possible in the example embodiments without materially departing from FLUID VISCOSITY CONTROL. Accordingly, all such modifications are intended to be included within the scope of this disclosure as defined in the following claims.

What is claimed is:

1. A method of treating a subterranean formation penetrated by a wellbore, the method comprising:
   introducing a treatment fluid comprised at least a crosslinkable component, and a metal crosslinker comprising a polyvalent metal ion to the subterranean formation;
   forming a crosslinked treatment fluid, and
   de-crosslinking bonds of the crosslinked treatment fluid by increasing a pH of the treatment fluid with a pH triggering agent,
   wherein the pH triggering agent is an amine-precursor compound or a derivative thereof.

2. The method of claim 1, wherein the pH triggering agent is present in the treatment fluid.

3. The method of claim 1, wherein the pH triggering agent is present in the subterranean formation prior to the introduction of the treatment fluid.

4. The method of claim 1, wherein the method further comprises a first pH triggering agent and a second pH triggering agent.

5. The method of claim 4, wherein the second pH triggering agent re-crosslinks the de-crosslinked fluid.

6. The method of claim 5, wherein the second pH triggering agent re-crosslinks the de-crosslinked fluid by decreasing the pH of the de-crosslinked fluid.

7. The method of claim 1, wherein pH triggering agent is a solid suspended in the treatment fluid.

8. The method of claim 1, wherein the pH triggering agent is encapsulated.

9. The method of claim 1, wherein the pH triggering agent is selected from the group consisting of urea, thiourea, N,N-dimethylurea, N,N-diethylurea, N,N-diallylurea, tetramethylurea, hexamine and combinations thereof.

10. The method of claim 1, wherein the treatment fluid further comprises a catalyst.

11. The method of claim 10, wherein the catalyst is an oxide selected from the consisting of vanadium pentoxide, titanium dioxide, zirconia and silica.

12. The method of claim 10, wherein the catalyst is a metal-organic complex of nickel (II) or palladium (II).

13. The method of claim 10, wherein the catalyst is an enzyme.

14. The method of claim 1, wherein the crosslinkable component is a natural polymer selected the group consisting of a guar gum, a locust bean gum, a tara gum, a honey locust gum, a tamarind gum, a karaya gum, an arabic gum, a ghatti gum, a tragacanth gum, a carrageenen, a succinoglycan, xanthan, diutan, alginate, hydroxylethylguar hydroxypropyl guar, carboxymethylhydroxyethyl guar, carboxymethylhydroxypropylguar (CMHPG), carboxymethyl cellulose (CMC), carboxyethyl cellulose, carboxymethyl guar (CMG) carboxymethylhydroxyethyl cellulose (CMHEC), and derivatives thereof.

15. The method of claim 1, wherein the crosslinkable component is a synthetic polymer selected from the group consisting of polyacrylic acid, co-polymers of polyacrylamide and polyacrylic acid, partially hydrolyzed polyacrylamide (PHPA), polymethacrylic acid and derivatives thereof.

16. The method of claim 1, wherein the metal crosslinker contains a metal ion selected from the group consisting of zirconium (IV), titanium (IV), aluminum (III), chromium (III) or any combination thereof.

* * * * *